(12) United States Patent
Ishii

(10) Patent No.: US 8,153,303 B2
(45) Date of Patent: Apr. 10, 2012

(54) NEGATIVE ELECTRODE MATERIAL FOR LITHIUM ION SECONDARY BATTERY AND METHOD FOR PRODUCING THE SAME

(75) Inventor: Kenta Ishii, Tokyo (JP)

(73) Assignee: Tokai Carbon Co., Ltd., Tokyo (JP)

( * ) Notice: Subject to any disclaimer, the term of this patent is extended or adjusted under 35 U.S.C. 154(b) by 225 days.

(21) Appl. No.: 12/311,675

(22) PCT Filed: Nov. 8, 2007

(86) PCT No.: PCT/JP2007/072139
§ 371 (c)(1), (2), (4) Date: Apr. 8, 2009

(87) PCT Pub. No.: WO2008/056820
PCT Pub. Date: May 15, 2008

(65) Prior Publication Data
US 2010/0021820 A1    Jan. 28, 2010

(30) Foreign Application Priority Data
Nov. 10, 2006  (JP) .................................. 2006-305018

(51) Int. Cl.
*H01M 4/38*    (2006.01)

(52) U.S. Cl. ...................... 429/231.4; 429/209; 429/322

(58) Field of Classification Search ............... 429/231.8, 429/209, 231.4, 322
See application file for complete search history.

(56) References Cited

U.S. PATENT DOCUMENTS

2004/0234859 A1 * 11/2004 Lee et al. ................. 429/231.95
2009/0136849 A1 *  5/2009 Yue et al. ................... 429/231.8

* cited by examiner

*Primary Examiner* — Jane Rhee
(74) *Attorney, Agent, or Firm* — Flynn, Thiel, Boutell & Tanis, P.C.

(57) ABSTRACT

A negative electrode material for lithium ion secondary batteries includes core-shell composite particles prepared by covering the surface of a graphite powder with an amorphous carbon powder via a carbide of binder pitch, the graphite powder having an average particle diameter of 5 to 30 μm and an average lattice spacing d(002) of less than 0.3360 nm, and the amorphous carbon powder having an average particle diameter of 0.05 to 2 μm and an average lattice spacing d(002) of 0.3360 nm or more. A method to produce the negative electrode material includes mixing a graphite powder with pitch having a softening point of 70 to 250° C., adding an amorphous carbon powder to the resulting product, kneading the mixture while applying a mechanical impact to soften the pitch and carbonizing the pitch by heat treatment of the mixture at 750 to 2250° C. in a non-oxidizing atmosphere.

3 Claims, No Drawings

NEGATIVE ELECTRODE MATERIAL FOR LITHIUM ION SECONDARY BATTERY AND METHOD FOR PRODUCING THE SAME

TECHNICAL FIELD

The present invention relates to a negative electrode material for lithium-ion secondary batteries that allows charge and discharge at large current, and a method of producing the same.

BACKGROUND ART

A lithium secondary battery (i.e., non-aqueous electrolyte secondary battery) that utilizes an organic lithium salt electrolyte has a reduced weight and a high energy density, and it has been expected to be a power supply for small electronic instruments, a small portable power supply, a power storage battery, and the like. Lithium metal has been used as a negative electrode material for lithium secondary batteries. Lithium metal is dissolved in an electrolyte as lithium ion during discharge, and lithium ion deposits on the surface of the negative electrode as lithium metal during charge. However, it is difficult to recover the original state of lithium ion deposited on the electrode surface (i.e., lithium ion tends to deposit in the form of a dendrite). Since the dendrite decomposes the electrolyte due to very high activity, the battery performance deteriorates, so that the charge-discharge cycle life decreases. Moreover, the dendrite may grow to reach the positive electrode, so that the electrodes may be short-circuited.

In order to overcome the above-mentioned drawbacks, use of a carbon material instead of lithium metal has been proposed. Since the carbon material does not allow lithium ion to deposit in the form of dendrite during storage or release of lithium ion, the carbon material is suitable for the negative electrode material. Specifically, a graphite material, such as natural graphite, has a high lithium ion storage/release capability, so that the storage/release reaction occurs promptly. Therefore, a graphite material ensures a high charge-discharge efficiency, and its discharge capacity is as high as the theoretical value of 372 mAh/g, and a high-voltage battery can be produced due to its low potential, which is almost equal to that of lithium metal during charge and discharge, for example.

A graphite material highly graphitized and having highly developed hexagonal carbon structures has a large discharge capacity, and it ensures a high first cycle charge-discharge efficiency of 90% or more. On the other hand, such a graphite material has a flat potential curve property during discharge, so that it is difficult to determine the discharge end point. Moreover, since a large amount of current cannot be discharged in a short time when a graphite material is used, the rate performance deteriorates, for example.

Various attempts have been made to solve the above-mentioned problems, such as improving the properties of a carbon material such as a graphite material (e.g., a carbon material having a two-layer structure obtained by covering the surface of a graphite material having a high degree of graphitization with a carbonaceous substance having a low degree of graphitization), or combining a graphite material having a high degree of graphitization with a carbonaceous substance having a low degree of graphitization, and so on.

For example, JP-A-4-368778 discloses a carbon negative electrode for secondary batteries obtained by covering the surface of carbon (active material) that comes in contact with an electrolyte with an amorphous carbon having a turbostratic structure, an average interlayer spacing in the C-axis direction of 0.337 to 0.360 nm, and a peak intensity ratio of 1360 $cm^{-1}$ to 1580 $cm^{-1}$ in an argon laser Raman spectrum of 0.4 to 1.0.

JP-A-6-267531 discloses an electrode material having a multilayer structure obtained by mixing particles of a carbonaceous substance (A) that satisfies the following condition (1) with particles of an organic compound (B) that satisfies the following condition (2), and the organic compound (B) is carbonized by heat treatment, so that the particles of the carbonaceous substance (A) are covered with a carbonaceous substance (C) that satisfies the following condition (3).

(1) The average lattice spacing d002 determined by wide-angle X-ray diffraction analysis is 3.37 angstroms or less, the true density is 2.10 $g/cm^3$ or more, and the volume average particle diameter is 5 μm or more.
(2) The volume average particle diameter is smaller than that of the carbonaceous substance (A).
(3) The average lattice spacing d002 determined by wide-angle X-ray diffraction analysis is 3.38 angstroms or more, a peak PA exists in the range of 1580 to 1620 $cm^{-1}$ and a peak PB exists in the range of 1350 to 1370 $cm^{-1}$ when determined by Raman spectrum analysis using argon ion laser light, and the ratio R (IB/IA) of the intensity IB at the peak PB to the intensity IA at the peak PA is 0.2 or more.

These electrode materials are produced by forming an amorphous carbon layer on the surface of graphite particle. However, since graphitization easily progresses, it is difficult to form a thick amorphous carbon layer, so that the rate performance is not sufficiently improved.

A method to cover the surface of graphite particle with carbon black (amorphous carbon) has also been proposed. For example, JP-A-6-267533 discloses a lithium secondary battery wherein carbon black that has a DBP absorption of 100 ml/100 g or more and arithmetic mean primary particle diameter of 40 nm or more and carries lithium (negative electrode active material) is used as a negative electrode. Ethylene carbonate or an organic solvent that contains ethylene carbonate in an amount of 20 vol % or more is used as an electrolyte.

JP-A-7-153447 discloses a lithium secondary battery negative electrode that includes a carbon material that can store lithium (negative electrode active material) and a binder, wherein the carbon material is carbon black having a DBP absorption of 100 ml/100 g or more, and the binder is polyvinylidene fluoride.

JP-A-2001-332263 discloses a lithium ion secondary battery wherein the negative electrode includes graphite of which Gs=Hsg/Hsd is 10 or less in a surface-enhanced Raman spectrum. JP-A-2001-332263 also discloses a process of producing a carbon negative electrode material that includes mixing at least one of a carbon material and mesocarbon micro-beads grown at a temperature equal to or more than the production temperature and equal to or less than 2000° C., with a coating material that contains at least one of pitch containing free carbon, pitch having a quinoline-insoluble content of 2% or more, and a polymer, and graphitizing the material.

According to the above-mentioned negative electrode material, since the production temperature of the carbon material is low, the carbon material has an average lattice spacing d(004) of 0.336 nm or more. As a result, the reversible capacity decreases due to an insufficient degree of graphitization. Moreover, the above-mentioned documents do not aim at positively utilizing the high rate performance of carbon black. Moreover, when the surface of graphite is covered with pitch in which carbon black is dispersed, since the carbon black that is completely covered with the pitch has strong aggregating properties, the surface of the graphite cannot be covered with the pitch in which the carbon black is uniformly dispersed.

DISCLOSURE OF THE INVENTION

Since carbon black particles have large specific surface areas and form aggregates (structures), a loss (charge capacity–discharge capacity) increases. Moreover, the density of a carbon black layer that covers a graphite material decreases.

The inventors of the present invention conducted extensive studies in order to develop a negative electrode material by effectively utilizing the high reversible capacity and the high first cycle efficiency of a graphite material and the excellent rate performance of an amorphous carbon material. As a result, the inventors found that core-shell composite particles prepared by covering the surface of a highly graphitized graphite powder with an amorphous carbon powder exhibit a high reversible capacity, a high first cycle efficiency, an excellent rate performance, and the like.

The present invention was conceived based on the above finding. An object of the present invention is to provide a negative electrode material for lithium ion secondary batteries that solves the above-described problems and exhibits an excellent rate performance, a high reversible capacity, and a high first cycle efficiency, and a method of producing the same.

A negative electrode material for lithium ion secondary batteries according to the present invention that achieves the above object comprises core-shell composite particles prepared by covering the surface of a graphite powder with an amorphous carbon powder via a carbide of binder pitch, the graphite powder having an average particle diameter of 5 to 30 μm and an average lattice spacing d(002) of less than 0.3360 nm, the amorphous carbon powder having an average particle diameter of 0.05 to 2 μm and an average lattice spacing d(002) of 0.3360 nm or more, the composite particles having (1) a specific surface area by nitrogen adsorption of 3 to 7 $m^2/g$, (2) an average particle diameter of 7 to 40 μm, and (3) a Raman spectrum intensity ratio I1360/I1580 of 0.6 or more.

It is preferable that graphite forming the core of the composite particles have an average lattice spacing d(002) of less than 0.3360 nm and an average particle diameter of 5 to 30 um. It is preferable that the amorphous carbon forming the shell of the composite particles have an average lattice spacing d(002) of 0.3360 nm or more and an average particle diameter of 0.05 to 2 um.

A method to produce a negative electrode material for lithium ion secondary batteries according to the present invention comprises mixing a graphite powder having an average particle diameter of 5 to 30 μm and an average lattice spacing d(002) of less than 0.3360 nm with pitch having a softening point of 70 to 250° C. to cover the surface of the graphite powder with the pitch, adding an amorphous carbon powder having an average particle diameter of 0.05 to 2 μm and an average lattice spacing d(002) of 0.3360 nm or more to the resulting product, kneading the mixture while applying a mechanical impact to soften the pitch, so that the amorphous carbon powder is dispersed and stabilized in the pitch that has softened, and carbonizing the pitch by heat treatment at 750 to 2250° C. in a non-oxidizing atmosphere.

BEST MODE FOR CARRYING OUT THE INVENTION

The negative electrode material for lithium ion secondary batteries according to the present invention includes core-shell composite particles prepared by covering a graphite powder (core) with amorphous carbon (shell). Natural graphite or artificial graphite having an average particle diameter of 5 to 30 μm is used as the graphite powder.

The term "average particle diameter" used herein refers to a volume median diameter measured using a laser diffraction particle size distribution measuring instrument (e.g., "SALD 2000" manufactured by Shimadzu Corporation).

If the average particle diameter of the graphite powder is less than 5 μm, the composite particles may have a particle diameter as small as less than 10 μm. As a result, the dispersibility of the composite particles decreases when its slurry is prepared in the production of a lithium ion secondary battery. If the average particle diameter of the graphite powder is more than 30 μm, the composite particles have a large particle diameter. In particular, when the particle diameter is more than 40 μm, the input/output performance of the lithium ion secondary battery decreases. For example, the capacity ratio of charge to discharge at a rate of 2 C or more deteriorates.

Regarding the degree of graphitization of the graphite powder, it is preferable that the graphite powder has an average lattice spacing d(002) of less than 0.3360 nm. If the graphite powder has an average lattice spacing d(002) of 0.3360 nm or more, the reversible capacity of the battery decreases.

The term "average lattice spacing d(002)" used herein refers to a value measured by a wide angle X-ray diffraction analysis (Gakushin method) using a reflecting diffractometer method utilizing CuKα rays that are made monochrome by a graphite monochromator.

It is preferable that the amorphous carbon powder forming the shell have an average particle diameter of 0.05 to 2 μm. If the amorphous carbon powder has an average particle diameter of less than 0.05 μm, since the specific surface area of the composite particles increases, a first cycle charge-discharge loss increases even if the battery has excellent input/output performance. If the amorphous carbon powder has an average particle diameter of more than 2 μm, since the amorphous carbon powder is not strongly bonded to the surface of the graphite powder, the input/output performance of the battery are not sufficiently improved.

It is preferable that the amorphous carbon powder have an average lattice spacing d(002) of 0.3360 nm or more. If the amorphous carbon powder has an average lattice spacing d(002) of less than 0.3360 nm, the capacity ratio of charge to discharge at a rate of 2 C or more decreases. As the amorphous carbon powder, carbon black, a powder obtained by pulverizing coke or a resin carbide, or the like is used.

The negative electrode material for lithium ion secondary batteries according to the present invention includes the core-shell composite particles prepared by covering the surface of the graphite powder (core) with the amorphous carbon powder (shell) via a carbide of binder pitch, the composite particles having the following properties.

1. A specific surface area by nitrogen adsorption of 3 to 7 $m^2/g$
2. An average particle diameter of 7 to 40 μm
3. A Raman spectrum intensity ratio I1360/I1580 of 0.6 or more If the composite particles have a specific surface area by nitrogen adsorption of less than 3 $m^2/g$, since the reaction area required for insertion and extraction of lithium ions is small, the input/output performance of the battery decrease. If the composite particles have a specific surface area by nitrogen adsorption of more than 7 $m^2/g$, a first cycle charge-discharge loss increases due to an increase in reaction area. The specific surface area is measured by nitrogen adsorption method with a surface area meter (automatic surface area measuring instrument manufactured by Shimadzu Corporation). The measurement target (graphite material) is preliminarily dried at 350° C. for 30 minutes while circulating nitrogen. The specific surface area of the measurement target is then measured by a nitrogen adsorption BET ten-point method utilizing a gas flow method using a nitrogen-helium mixed gas of which the relative pressure of nitrogen with respect to the atmospheric pressure is accurately adjusted to 0.3.

If the composite particles have an average particle diameter of less than 7 μm, the dispersibility of the composite particles decreases when its slurry is prepared in the production of a lithium ion secondary battery. If the composite particles have an average particle diameter of more than 40 μm, the input/output performance of the lithium ion secondary battery decrease. For example, the capacity ratio of charge to discharge at a rate of 2 C or more deteriorates.

The Raman spectrum indicates the degree of disorder of the crystal structure of the surface layer of the particles, and it is measured with a Raman spectrochemical analyzer ("NR1100" manufactured by JASCO Corporation) using an argon laser (wavelength: 514.5 nm). The degree of disorder of the crystal structure of the surface layer of the particles is indicated by the Raman spectrum intensity ratio R=I1360/I1580 obtained by dividing the spectrum I1360 at about 1360 $cm^{-1}$ that is attributed to the disorder of the crystal structure due to crystal defects in the surface layer, a mismatch of the layered structure, and the like, by the spectrum I1580 at about 1580 $cm^{-1}$ that is attributed to a E2g vibration that corresponds to a lattice vibration inside the hexagonal carbon layer. If the Raman spectrum intensity ratio R is 0.6 or more, the battery has excellent input/output performance.

The negative electrode material for lithium ion secondary batteries according to the present invention is formed of the composite particles having the above-mentioned properties. It is preferable that graphite forming the core of the composite particles have an average lattice spacing d(002) of less than 0.3360 nm and an average particle diameter of 5 to 30 μm. It is preferable that amorphous carbon forming the shell of the composite particles have an average lattice spacing d(002) of 0.3360 nm or more and an average particle diameter of 0.05 to 2 μm.

It is preferable to adjust the tap density of the composite particles to 0.9 $g/cm^3$ or more in order to improve the battery capacity. The tap density is determined as follows. Specifically, 5 g of the composite particles are put in a graduated cylinder (25 ml). After adjusting the gap with a diaphragm to 10 mm, the cylinder is repeatedly tapped 1000 times. The density of the composite particles measured after the above operation is determined to be the tap density.

The negative electrode material for lithium ion secondary batteries according to the present invention that is formed of the composite particles having the above-mentioned properties is produced by mixing a graphite powder having an average particle diameter of 5 to 30 μm and an average lattice spacing d(002) of less than 0.3360 nm with pitch having a softening point of 70 to 250° C. to cover the surface of the graphite powder with the pitch, adding an amorphous carbon powder having an average particle diameter of 0.05 to 2 μm and an average lattice spacing d(002) of 0.3360 nm or more to the resulting product, kneading the mixture while applying a mechanical impact to soften the pitch, so that the amorphous carbon powder is dispersed and stabilized in the pitch that has softened, and carbonizing the pitch by heat treatment at 750 to 2250° C. in a non-oxidizing atmosphere.

First, the graphite powder having an average particle diameter of 5 to 30 μm and an average lattice spacing d(002) of less than 0.3360 nm is mixed with the pitch having a softening point of 70 to 250° C. The softening point is measured by a ring-and-ball method. If the softening point of the pitch is less than 70° C., the pitch is melted so that the amorphous carbon powder added later adheres to the pitch and is pelletized. If the softening point of the pitch is more than 250° C., since the pitch does not soften sufficiently, the surface of the graphite powder cannot be uniformly covered with the pitch. As a result, the adhesive strength of the shell of the composite particles decreases.

The graphite powder and the pitch are mixed as follows. Specifically, the graphite powder is input into an appropriate heating mixer such as a kneader, and it is heated to a given temperature that exceeds the softening point of the pitch while kneading. After that, the pitch is added to the graphite powder in the heating mixer, and the mixture is sufficiently kneaded. The pitch is preferably added in an amount of 10 to 50 parts by weight based on 100 parts by weight of the graphite powder. If the amount of the pitch is less than 10 parts by weight, the entire surface of the graphite powder cannot be covered with the pitch. If the amount of the pitch is more than 50 parts by weight, since the graphite powder aggregates, it is difficult to separate the graphite powder into individual particles. As a result, since the particle diameter of the resulting composite particles increases to a large extent, the thickness of the pitch coating film formed on the surface of the graphite carbon particles becomes non-uniform, so that the pitch powder may remain. If the thickness of the pitch coating film formed on the surface of the graphite powder becomes non-uniform, since the shell particles are covered non-uniformly, the cycle characteristics deteriorate.

The kneading time is appropriately determined depending on the capacity of the kneader, the shape of the blade, the amount of raw material, and the like. After kneading, the mixture is cooled to room temperature to obtain graphite powder particles covered with the pitch. The graphite powder particles are then crushed, if necessary. A turbo mill (manufactured by Matsubo Corporation) or the like is used as a crusher.

After covering the surface of the graphite powder with the pitch, the amorphous carbon powder having an average particle diameter of 0.05 to 2 μm and an average lattice spacing d(002) of 0.3360 nm or more is added to the resulting product, and the mixture is kneaded. In this case, the amorphous carbon powder is added in an amount of 0.5 to 50 parts by weight based on parts by weight of the graphite powder. If the amount of the amorphous carbon powder is less than 0.5 parts by weight, since the entire surface of the graphite powder cannot be covered with the amorphous carbon powder, the high rate performance deteriorates. If the amount of the amorphous carbon powder is more than 50 parts by weight, the reversible capacity decreases due to an increase in pitch carbide content. The amorphous carbon powder is preferably added in an amount of 1 to 30 parts by weight.

While kneading the mixture, mechanical energy is given to the surface of it by compression, confliction and friction between the powder particles due to mechanical impact. The temperature of the mixture increases by this process. When the temperature of the mixture reaches a moderate temperature region, the pitch softens. The mixture covered with pitch of a moderate tackiness is kneaded with the amorphous carbon powder, so that the amorphous carbon powder is dispersed and stabilized in the pitch. The amorphous carbon powder thus adheres to the surface of the graphite powder via the pitch. Therefore, the graphite powder and the amorphous carbon powder are strongly bonded, and the graphite powder can be uniformly covered with the amorphous carbon powder.

The pitch that covers the surface of the graphite powder softens by compression and friction between the particles while applying mechanical impact. Therefore, the amorphous carbon powder can be stabilized on the surface of the graphite powder via the softened pitch. Specific examples of a suitable kneading machine include Mechanofusion (manufactured by Hosokawa Micron Corporation), Hybridizer (manufactured by Nara Machinery Co., Ltd.), and the like. Note that the kneading machine is not limited thereto.

After kneading, the resulting product is carbonized by heat treatment at 750 to 2250° C. in a non-oxidizing atmosphere, so that the amorphous carbon powder dispersed in the pitch adheres to and covers the surface of the graphite powder. Composite particles consisted of graphite as a core and amorphous carbon as a shell are thus obtained.

If the pitch carbonizing (heat treatment) temperature is 750° C. or, less, since unburned pitch remains, the charging-discharging efficiency and the cycle life of the lithium ion secondary battery deteriorate. If the pitch carbonizing (heat treatment) temperature is 2250° C. or more, since the amorphous carbon powder and the pitch carbide are graphitized, the discharge capacity at high rate decrease.

The composite particles thus obtained are optionally crushed and classified so that the composite particles have a maximum particle diameter of 60 µm and an average particle diameter of 7 to 40 µm to produce a negative electrode material for lithium ion secondary batteries.

EXAMPLES

The present invention is further described below by way of examples and comparative examples.

Example 1

Production of Composite Particles 100 parts by weight of spherical natural graphite ("CGC-15" manufactured by Nippon Graphite Industries, Ltd.) having an average particle diameter of 17.0 µm and an average lattice spacing d(002) of 0.3355 nm and 30 parts by weight of coal tar pitch ("PKQL" manufactured by JFE Chemical Corporation, softening point: 70° C.) were kneaded for 30 minutes with a kneader. The mixture was then cooled to room temperature. A mixture powder separated into individual particles was thus obtained.

After the addition of 10 parts by weight of furnace black (carbon black) ("S-TA" manufactured by Tokai Carbon Co., Ltd., lattice spacing d(002) determined by X-ray diffraction analysis: 0.3620 nm, average particle diameter: 0.7 µm), the components were sufficiently mixed. The resulting mixture powder was input into a hybridizer device (manufactured by Nara Machinery Co., Ltd.), and processed for three minutes at a rotational speed of 8000 rpm while maintaining the maximum temperature inside the device at 75° C. or less.

The coal tar pitch in the resulting powder was then carbonized by heat treatment of the resulting powder at 800° C. in a nitrogen gas atmosphere. The resulting product was then crushed ("Turbo Mill" manufactured by Matsubo Corporation), and classified ("Sieve Classification", opening: 32 µm) to produce composite particles (that passed through the sieve).

Example 2

100 parts by weight of spherical natural graphite ("CGC-15" manufactured by Nippon Graphite Industries, Ltd.) having an average particle diameter of 17.0 µm and an average lattice spacing d(002) of 0.3355 nm and 20 parts by weight of coal tar pitch ("PKQL" manufactured by JFE Chemical Corporation, softening point: 89° C.) were kneaded for 30 minutes with a kneader. The mixture was then cooled to room temperature. A mixture powder separated into individual particles was thus obtained.

After 30 parts by weight of lamp black (carbon black) ("Carbofin GK", lattice spacing d(002) determined by X-ray diffraction analysis: 0.3740 nm, average particle diameter: 0.9 µm) is added, the components were sufficiently mixed. The resulting mixture powder was input into a hybridizer device (manufactured by Nara Machinery Co., Ltd.), and processed for three minutes at a rotational speed of 8000 rpm while maintaining the maximum temperature inside the device at 85° C. or less.

The coal tar pitch in the resulting powder was then carbonized by heat treatment of the resulting powder at 1000° C. in a nitrogen gas atmosphere. The resulting product was then crushed ("Turbo Mill" manufactured by Matsubo Corporation), and classified ("Sieve Classification", opening: 32 µm) to produce composite particles (that passed through the sieve).

Example 3

100 parts by weight of spherical natural graphite ("CGC-30" manufactured by Nippon Graphite Industries, Ltd.) having an average particle diameter of 30.0 µm and an average lattice spacing d(002) of 0.3355 nm and 1 part by weight of mesophase pitch ("MCP-150D" manufactured by JFE Chemical Corporation, softening point: 150° C.) were kneaded for 30 minutes with a kneader. The mixture was then cooled to room temperature. A mixture powder separated into individual particles was thus obtained.

After 5 parts by weight of non-graphitizing coke (lattice spacing d(002) determined by X-ray diffraction analysis: 0.3422 nm, average particle diameter: 1.8 µm) is added, the components were sufficiently mixed. The resulting mixture powder was input into a hybridizer device (manufactured by Nara Machinery Co., Ltd.), and processed for three minutes at a rotational speed of 8000 rpm while maintaining the maximum temperature inside the device at 165° C. or less.

The mesophase pitch in the resulting powder was then carbonized by heat treatment of the resulting powder at 1500° C. in a nitrogen gas atmosphere. The resulting product was then crushed ("Turbo Mill" manufactured by Matsubo Corporation), and classified ("Sieve Classification", opening: 32 µm) to produce composite particles (that passed through the sieve).

Example 4

100 parts by weight of spherical natural graphite ("CGC-15" manufactured by Nippon Graphite Industries, Ltd.) having an average particle diameter of 17.0 µm and an average lattice spacing d(002) of 0.3355 nm and 10 parts by weight of mesophase pitch ("MCP-250D" manufactured by JFE Chemical Corporation, softening point: 250° C.) were kneaded for 30 minutes with a kneader. The mixture was then cooled to room temperature. A mixture powder separated into individual particles was thus obtained.

After 1 part by weight of carbon microspheres (manufactured by Tokai Carbon Co., Ltd., lattice spacing d(002) determined by X-ray diffraction analysis: 0.3640 nm, average particle diameter: 0.4 µm) is added, the components were sufficiently mixed. The resulting mixed powder was input into a hybridizer device (manufactured by Nara Machinery Co., Ltd.), and processed for three minutes at a rotational speed of 8000 rpm while maintaining the maximum temperature inside the device at 270° C. or less.

The mesophase pitch in the resulting powder was then carbonized by heat treatment at 1500° C. in a nitrogen gas atmosphere. The resulting product was then crushed ("Turbo Mill" manufactured by Matsubo Corporation), and classified ("Sieve Classification", opening: 32 μm) to produce composite particles (that passed through the sieve).

Example 5

100 parts by weight of graphitizing coke (processed at 2800° C.) having an average particle diameter of 5.0 μm and an average lattice spacing d(002) of 0.3357 nm and 50 parts by weight of coal tar (softening point: 70° C.) were kneaded for 30 minutes with a kneader. The mixture was then cooled to room temperature. A mixture powder separated into individual particles was thus obtained.

After 10 parts by weight of classified Asahi Thermal (carbon black) (manufactured by Asahi Carbon Co., Ltd., lattice spacing d(002) determined by X-ray diffraction analysis: 0.3630 nm, average particle diameter: 0.05 μm) is added, the components were sufficiently mixed. The resulting mixture powder was input into a hybridizer device (manufactured by Nara Machinery Co., Ltd.), and processed for three minutes at a rotational speed of 8000 rpm while maintaining the maximum temperature inside the device at 75° C. or less.

The coal tar in the resulting powder was then carbonized by heat treatment at 2250° C. in a nitrogen gas atmosphere. The resulting product was then crushed ("Turbo Mill" manufactured by Matsubo Corporation), and classified ("Sieve Classification", opening: 32 μm) to produce composite particles (that passed through the sieve).

Comparative Example 1

Composite particles were produced in the same manner as in Example 1, except that the mixed power was not processed with the hybridizer device.

Comparative Example 2

Composite particles were produced in the same manner as in Example 1, except that reformed coal tar (softening point: 60° C.) was used instead of the coal tar pitch.

Comparative Example 3

Composite particles were produced in the same manner as in Example 1, except that reformed mesophase pitch (softening point: 300° C.) was used instead of the coal tar pitch.

Comparative Example 4

Composite particles were produced in the same manner as in Example 1, except that spherical natural graphite ("LB-CG-35" manufactured by Nippon Graphite Industries, Ltd.) having a median diameter of 35.0 μm and a lattice spacing d(002) of 0.3355 nm was used instead of the spherical natural graphite.

Comparative Example 5

Composite particles were produced in the same manner as in Example 1, except that large GC (thermosetting resin carbonized at 1000° C.) carbon micro-beads (average particle diameter: 3.0 μm, lattice spacing d(002): 0.3790 nm) were used instead of the carbon black.

Comparative Example 6

Composite particles were produced in the same manner as in Example 1, except that graphitized carbon black (average particle diameter: 0.7 μm, lattice spacing d(002): 0.3442 nm) was used instead of the carbon black.

Comparative Example 7

Composite particles were produced in the same manner as in Example 1, except that the heat treatment temperature was set at 2500° C.

Comparative Example 8

Composite particles were produced in the same manner as in Example 1, except that the amount of the coal tar pitch was changed to 0.4 parts by weight and the heat treatment temperature was set at 2500° C.

Comparative Example 9

Composite particles were produced in the same manner as in Example 1, except that the heat treatment temperature was set at 700° C.

Comparative Example 10

Composite particles were produced in the same manner as in Example 1, except that non-graphitizing coke (processed at 2800° C., average particle diameter: 13.0 μm, lattice spacing d(002): 0.3364 nm) was used instead of the spherical natural graphite.

Table 1 shows the properties and the amount (parts by weight) of each raw material for the composite particles obtained in Examples 1 to 5 and Comparative Examples 1 to 10, and table 2 shows the production conditions and the properties of the composite particles.

TABLE 1

| | | Graphite powder | | | Amorphous carbon powder | | | Pitch | |
|---|---|---|---|---|---|---|---|---|---|
| | | Average particle diameter (μm) | d(002) (nm) | Amount (parts by weight) | Average particle diameter (μm) | d(002) (nm) | Amount (parts by weight) | Softening point (° C.) | Amount (parts by weight) |
| Example | 1 | 17 | 0.3355 | 100 | 0.7 | 0.3620 | 10 | 70 | 30 |
| | 2 | 17 | 0.3355 | 100 | 0.9 | 0.3740 | 30 | 89 | 20 |
| | 3 | 30 | 0.3355 | 100 | 1.8 | 0.3422 | 5 | 150 | 1 |
| | 4 | 17 | 0.3355 | 100 | 0.4 | 0.3640 | 1 | 250 | 10 |

TABLE 1-continued

|  |  | Graphite powder | | | Amorphous carbon powder | | | Pitch | |
|---|---|---|---|---|---|---|---|---|---|
|  |  | Average particle diameter (μm) | d(002) (nm) | Amount (parts by weight) | Average particle diameter (μm) | d(002) (nm) | Amount (parts by weight) | Softening point (°C.) | Amount (parts by weight) |
|  | 5 | 5 | 0.3357 | 100 | 0.05 | 0.3630 | 10 | 70 | 50 |
| Comparative Example | 1 | 17 | 0.3355 | 100 | 0.7 | 0.3620 | 10 | 70 | 30 |
|  | 2 | 17 | 0.3355 | 100 | 0.7 | 0.3620 | 10 | 60 | 30 |
|  | 3 | 17 | 0.3355 | 100 | 0.7 | 0.3620 | 10 | 300 | 30 |
|  | 4 | 35 | 0.3355 | 100 | 0.7 | 0.3620 | 10 | 70 | 30 |
|  | 5 | 17 | 0.3355 | 100 | 3.0 | 0.3790 | 10 | 70 | 30 |
|  | 6 | 17 | 0.3355 | 100 | 0.7 | 0.3442 | 10 | 70 | 30 |
|  | 7 | 17 | 0.3355 | 100 | 0.7 | 0.3620 | 10 | 70 | 30 |
|  | 8 | 17 | 0.3355 | 100 | 0.7 | 0.3620 | 10 | 70 | 0.4 |
|  | 9 | 17 | 0.3355 | 100 | 0.7 | 0.3620 | 10 | 70 | 30 |
|  | 10 | 13 | 0.3364 | 100 | 0.7 | 0.3620 | 10 | 70 | 30 |

TABLE 2

|  |  | Kneading | | heat tretment | Properties of composite particles | | | |
|---|---|---|---|---|---|---|---|---|
|  |  | Impact | Temperature (°C.) | temperature (°C.) | Average particle diameter (μm) | d(002) (nm) | Specific surface area (m²/g) | Intensity ratio (R)*1 |
| Example | 1 | Applied | 75 | 800 | 18.4 | 0.3355 | 4.2 | 0.72 |
|  | 2 | Applied | 85 | 1000 | 18.6 | 0.3355 | 5.9 | 0.6 |
|  | 3 | Applied | 165 | 1500 | 19.3 | 0.3355 | 3.6 | 0.69 |
|  | 4 | Applied | 270 | 1500 | 18.4 | 0.3355 | 4.6 | 0.67 |
|  | 5 | Applied | 75 | 2250 | 7.2 | 0.3357 | 3.9 | 0.62 |
| Comparative Example | 1 | Not applied | 75 | 800 | 17.9 | 0.3355 | 3.3 | 0.29 |
|  | 2 | Applied | 75 | 1000 | 20.1 | 0.3355 | 2.9 | 0.48 |
|  | 3 | Applied | 75 | 1000 | 18.1 | 0.3355 | 4.3 | 0.25 |
|  | 4 | Applied | 75 | 1000 | 42.1 | 0.3355 | 2.8 | 0.26 |
|  | 5 | Applied | 75 | 1000 | 18.1 | 0.3355 | 3.6 | 0.27 |
|  | 6 | Applied | 75 | 1000 | 17.8 | 0.3355 | 3.1 | 0.37 |
|  | 7 | Applied | 75 | 2500 | 17.7 | 0.3355 | 3.0 | 0.39 |
|  | 8 | Applied | 75 | 2500 | 17.8 | 0.3355 | 3.8 | 0.29 |
|  | 9 | Applied | 75 | 700 | 18.2 | 0.3355 | 4.5 | 0.68 |
|  | 10 | Applied | 75 | 800 | 15.5 | 0.3364 | 4.4 | 0.71 |

*1Raman spectrum intensity ratio

A lithium ion secondary battery was produced by the following method using the composite particles as a negative electrode material, and the performance of the lithium ion secondary battery was evaluated.

Preparation of Slurry

An appropriate amount of a 1 wt % carboxymethyl cellulose (CMC) aqueous solution (thickener) was added to 100 parts by weight of the composite particles. The mixture was stirred for 30 minutes. After the addition of an appropriate amount of a 40 wt % styrene-butadiene rubber (SBR) aqueous solution (binder), the mixture was stirred for five minutes to prepare a negative electrode paste.

Production of Working Electrode

The negative electrode material paste was applied to a copper foil (collector) having a thickness of 18 μm, and then heated to 130° C. under vacuum to completely volatilize the solvent. The resulting electrode sheet was pressed with a roller press to the density of 1.5 g/cc, and punched to obtain a working electrode.

Production of Counter Electrode

A lithium metal foil was press onto a punched nickel mesh (collector) in an inert atmosphere to obtain a counter electrode.

Production of Evaluation Battery

A button-shaped battery (evaluation battery) was assembled in an inert atmosphere with the working electrode, the counter electrode, an electrolyte, a separator and so on. An ethylene carbonate (EC)-diethyl carbonate (DEC) mixed solution (1:1) which a lithium salt $LiPF_6$ (1 mol/dm$^3$) was dissolved in was used as the electrolyte. After the battery was charged at a current density of 0.2 mA/cm$^2$ up to a cut-off voltage of 5 mV, the voltage was kept constant until the current density reached lower limit value of 0.02 mA/cm$^2$. The battery was discharged at a current density of 0.2 mA/cm$^2$ up to a cut-off voltage of 1.5 V. The discharge capacity after five charge-discharge cycles was determined to be the reversible capacity. The battery was then charged at a current density of 5 mA/cm$^2$. Table 3 shows the results of the charge-discharge test.

TABLE 3

| | | Secondary battery characteristics | | | |
|---|---|---|---|---|---|
| | | Reversible capacity (mAh/g) | First cycle charge-discharge loss (mAh/g) | First cycle charge-discharge efficiency (%) | Charge capacity at rate of 2 C (mAh/g) |
| Example | 1 | 348 | 30 | 92 | 50 |
| | 2 | 351 | 48 | 88 | 59 |
| | 3 | 344 | 43 | 89 | 49 |
| | 4 | 341 | 26 | 93 | 62 |
| | 5 | 340 | 28 | 92 | 40 |
| Comparative Example | 1 | 350 | 46 | 88 | 29 |
| | 2 | 347 | 33 | 91 | 30 |
| | 3 | 351 | 45 | 89 | 24 |
| | 4 | 346 | 32 | 92 | 21 |
| | 5 | 350 | 37 | 90 | 19 |
| | 6 | 320 | 29 | 92 | 27 |
| | 7 | 318 | 27 | 92 | 22 |
| | 8 | 351 | 45 | 89 | 25 |
| | 9 | 342 | 51 | 87 | 48 |
| | 10 | 331 | 42 | 89 | 57 |

As shown in Table 3, since the powders obtained in Comparative Examples 1, 2, 3, and 5 did not have a core-shell structure, the rate performance of the core material was not improved. As a result, the charge capacity at rate of 2 C was smaller than that of Example 1. In Comparative Example 4, since the particle diameter of the core material was large (i.e., the lithium ion diffusion distance in carbon was long), the charge capacity at rate of 2 C decreased.

In Comparative Examples 6 and 7, since the lithium ion storage site and the lithium ion reaction site were reduced due to the developed crystal structure of the shell, the reversible capacity and charge capacity at rate of 2 C decreased. In Comparative Example 8, since the amount of carbon precursor was small, the core was not sufficiently covered with the shell. As a result, charge capacity at rate of 2 C decreased.

In Comparative Example 9, since the heat treatment temperature was low, the surface remained unburned to a large extent. As a result, a charge-discharge loss occurred during the first charge-discharge cycle. In Comparative Example 10, since the lattice spacing d(002) of the core material was large, the degree of the graphite crystal structure was low. As a result, since the number of lithium ion insertion sites was small, the reversible capacity decreased.

INDUSTRIAL APPLICABILITY

According to the present invention, since the surface of a graphite powder can be uniformly covered with amorphous carbon, the crystallinity of the surface of graphite can be reduced while reducing the specific surface area. Therefore, a negative electrode material for lithium ion secondary batteries that exhibits a high charging-discharging efficiency, a high capacity, and excellent input/output performance, and a method to produce the same can be provided.

The invention claimed is:

1. A negative electrode material for lithium ion secondary batteries comprising core-shell composite particles prepared by covering the surface of a graphite powder with an amorphous carbon powder via a carbide of binder pitch, the graphite powder having an average particle diameter of 5 to 30 μm and an average lattice spacing d(002) of less than 0.3360 nm, the amorphous carbon powder having an average particle diameter of 0.05 to 2 μm and an average lattice spacing d(002) of 0.3360 nm or more, the composite particles having (1) a specific surface area by nitrogen adsorption of 4.2 to 5.9 m$^2$g, (2) an average particle diameter of 7 to 40 μm, and (3) a Raman spectrum intensity ratio of I1360/I1580 of 0.6 or more.

2. A method to produce a negative electrode material for lithium ion secondary batteries comprising mixing a graphite powder having an average particle diameter of 5 to 30 μm and an average lattice spacing d(002) of less than 0.3360 nm with pitch having a softening point of 70 to 250° C., by adding the pitch in an amount of 10 to 50 parts by weight based on 100 parts by weight of the graphite powder, to cover the surface of the graphite powder with the pitch, adding an amorphous carbon powder having an average particle diameter of 0.05 to 2 μm and an average lattice spacing d(002) of 0.3360 nm or more to the resulting product, by adding the amorphous carbon in an amount of 0.5 to 50 parts by weight based on 100 parts by weight of the graphite powder, kneading the mixture while applying a mechanical impact to soften the pitch, so that the amorphous carbon powder is dispersed and stabilized in the pitch that has softened, and carbonizing the pitch by heat treatment of the mixture at 750 to 2250° C. in a non-oxidizing atmosphere wherein the composite particles having a specific surface area by nitrogen adsorption of 4.2 to 5.9m$^2$g.

3. The negative electrode material according to claim 1, wherein the carbide pitch is formed from pitch having a softening point of 70 to 250° C.

* * * * *